(12) United States Patent
Hofschulte et al.

(10) Patent No.: US 6,692,401 B2
(45) Date of Patent: Feb. 17, 2004

(54) TWO-STAGE GEAR MECHANISM

(75) Inventors: Wolfram H. Hofschulte, Bonndorf (DE); Wilfried Synovzik, Huefingen (DE); Heinrich Dismon, Gangelt (DE); Andreas Koester, Essen (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 09/963,098

(22) Filed: Sep. 25, 2001

(65) Prior Publication Data

US 2002/0077213 A1 Jun. 20, 2002

(30) Foreign Application Priority Data

Sep. 25, 2000 (DE) .......................................... 100 47 308

(51) Int. Cl.⁷ .............................................. F16H 57/08
(52) U.S. Cl. ...................... 475/331; 475/338; 475/344
(58) Field of Search ................................. 475/331, 338, 475/341, 344

(56) References Cited

U.S. PATENT DOCUMENTS

| | | | |
|---|---|---|---|
| 2,888,831 A | | 6/1959 | Malcom ...................... 74/421 |
| 2,901,925 A | * | 9/1959 | Gunderson et al. ......... 475/323 |
| 2,941,423 A | * | 6/1960 | Armington et al. ......... 180/372 |
| 3,658,303 A | * | 4/1972 | Funk ........................... 366/61 |
| 4,043,226 A | * | 8/1977 | Buuck ........................ 180/247 |
| 5,409,430 A | * | 4/1995 | Hashimoto et al. ......... 475/331 |
| 5,957,804 A | * | 9/1999 | Schulz et al. ............... 475/331 |

FOREIGN PATENT DOCUMENTS

DE    195 38 865    4/1997

* cited by examiner

Primary Examiner—Tisha D. Lewis
(74) Attorney, Agent, or Firm—Samuels, Gauthier & Stevens LLP

(57) ABSTRACT

A two-stage gear mechanism includes a drive shaft having a first gear stage disposed in a fixed housing and containing planetary wheels. The two-stage gear mechanism also includes a second gear stage, driven by the first gear stage and meshing with a drive shaft. Each of the planetary wheels is formed as a stepped double gear wheel with a first gear wheel that engages the drive shaft, and with a second gear wheel that points toward the direction of the output side. The bearing axles of each of the planetary wheels are disposed spatially fixed within the housing. The second gear wheels of the planetary wheels mesh with a hollow wheel of the second gear stage, the hollow wheel being non-rotationally coupled to the drive shaft.

18 Claims, 2 Drawing Sheets

TWO-STAGE GEAR MECHANISM

BACKGROUND OF THE INVENTION

The present invention relates to the field of gear mechanisms, and in particular to a gear mechanism that includes a plurality of planetary gears.

Conventional gear mechanisms include a first gear stage set in a fixed housing and planetary wheels, which drives a second gear stage that meshes with a drive shaft. One example of such a two-stage gear mechanism is shown for example in German Patent Specification DE 43 24 876 C1. The gear mechanism disclosed therein consists of two planetary gear stages connected one after the other. The entire gear mechanism is designed as a rotary gear mechanism, in which the individual planetary wheels of the planetary gear stages execute a rotational motion about the center axis of the gear mechanism, such that the individual planetary wheels of the planetary gear stages themselves again rotate about their own axis.

Such known gear mechanisms have the problem that the angular momentum of the rotating planetary wheels can lead to friction losses and stability problems that reduce the efficiency of the gear mechanism. Furthermore, a structure consisting of two planetary gear stages connected one after the other requires a relatively large amount of space.

Therefore, there is a need for a gear mechanism that reduces the rotating moments of inertia and at the same time reduces the overall structural space required by the gear mechanism.

SUMMARY OF THE INVENTION

Briefly, according to an aspect of the present invention, a two-stage gear mechanism includes a drive shaft having a first gear stage disposed in a fixed housing and containing planetary wheels. The two-stage gear mechanism also includes a second gear stage, driven by the first gear stage and meshing with a drive shaft. Each of the planetary wheels is formed as a stepped double gear wheel with a first gear wheel that engages the drive shaft, and with a second gear wheel that points toward the direction of the output side. The bearing axles of each of the planetary wheels are disposed spatially fixed within the housing. The second gear wheels of the planetary wheels mesh with a hollow wheel of the second gear stage, and the hollow wheel is non-rotationally coupled to the drive shaft.

Each of the planetary wheels is formed as a stepped double gear wheel, with a first gear wheel that engages the drive shaft, and a second gear wheel, pointing toward the direction of the output side. The bearing axles of each of the planetary wheels are disposed spatially fixed within the housing. The second gear wheels of the planetary wheels mesh with a hollow wheel of the second gear stage, the hollow wheel being non-rotationally coupled to the drive shaft.

Significantly, the planetary wheels rotate about their own axis, but not about the center axis of the gear mechanism, as is the case with previously-known planetary gears. The first gear stage of the present invention has planetary wheels which are each designed as stationary stepped double gear wheels. It is used to step down the rotary motion of a pinion seated on a drive shaft. The pinion is coupled, for example, to an electric motor. In combination with the second gear stage, not only is the rotary motion stepped down but at the same time the torque at the drive shaft is increased. Due to the spatially fixed planetary wheels, the gear mechanism allows a reduction of the rotating moments of inertia.

The second gear stage is designed as a hollow wheel that is non-rotationally coupled to the drive shaft, and which is driven by the spatially fixed planetary wheels of the first gear stage. The hollow wheel is preferably mounted at two points, such as for example at the free end of the drive shaft, and within the gear housing at a second bearing that is seated on a gear casing fixed within the housing.

The space-saving structure of the inventive gear mechanism not only allows the torque to be taken off at the output end, but also the transverse force to be applied at the output shaft end. Thus, the gear mechanism is especially suited as an actuator for engine components in a motor vehicle, and especially in an exhaust gas recycling system of a motor vehicle.

Several (e.g., three) planetary wheels constructed as stepped double gear wheels can be driven simultaneously by the drive shaft. For example, the first gear stage can include a cylindrical tooth gearing with three spatially fixed planetary wheels. The rotary motion is symmetrically introduced through such a plurality of planetary wheels. In addition, the rotating masses are reduced relative to conventional planetary gear mechanisms by the spatially fixed arrangement of the planetary wheels, which rotate about their own axis. Reducing the rotating moments of inertia improves the efficiency of the overall gear mechanism and reduces friction losses.

A casing is preferably fixedly situated within the housing, and includes openings to accept the spatially fixed bearing axles of the planetary wheels. One end of each of the spatially fixed bearing axles of the planetary wheels is mounted in casing openings, while the other end is seated in openings of the gear housing.

The gear housing is preferably formed of two housing shells. One of the housing shells serves as a motor flange, preferably for an electric motor that is coupled to the gear mechanism. The housing has a second housing shell, which is pot-shaped and on which is rigidly seated the first housing shell (e.g., the above-mentioned motor flange). The second housing shell has a central bore in which is situated one of the bearing bushes for the drive shaft. The other bearing bush for the drive shaft is situated centric to the gear axis and is held by the gear casing.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
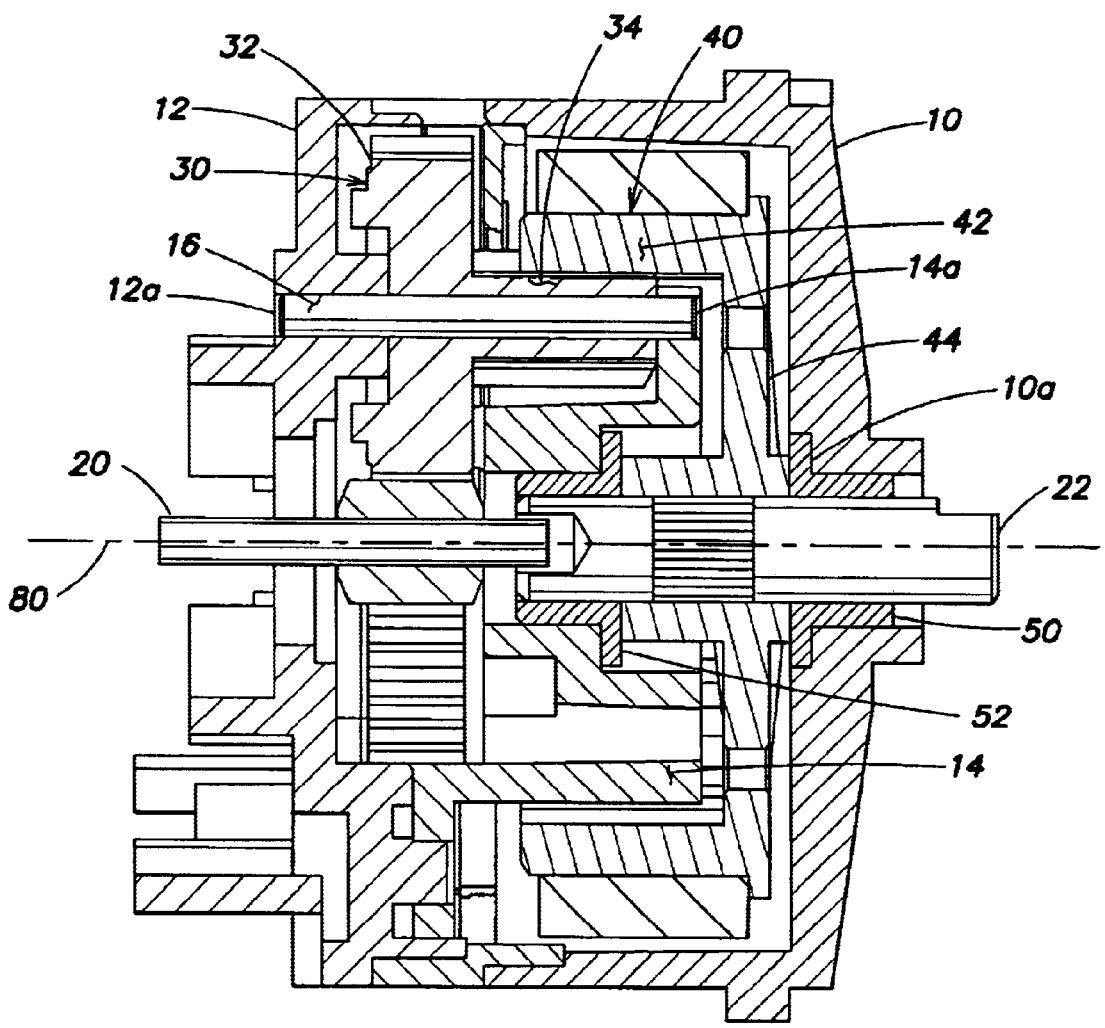
FIG. 1 is a cross sectional illustration of a two-stage gear mechanism.
Figure 2:
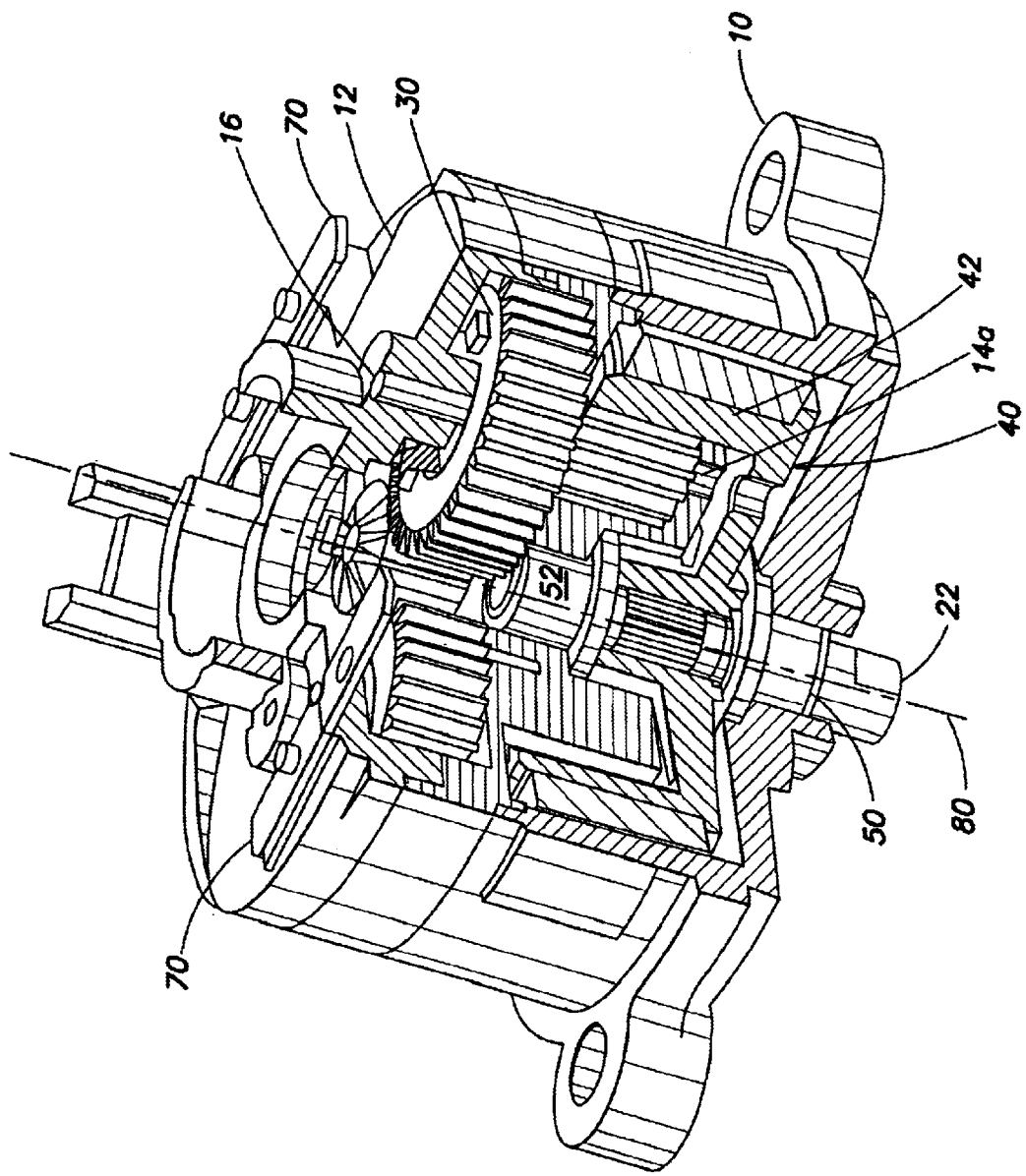
FIG. 2 is a perspective illustration of the gear mechanism of FIG. 1 partially exploded.

The two-stage gear mechanism illustrated in FIGS. 1 and 2 has a housing that includes first and second housing parts 10, 12 respectively. The pot-shaped first housing part 10 is seated on the plate-shaped second housing part 12. This second housing part is designed, for example as the motor flange for an electric motor 60, which is coupled to the gear mechanism. The housing part 12 has an opening, centric to the center axis 80 of the gear mechanism, through which extends a drive shaft 20. A drive pinion, which is not shown for the sake of clarity and ease of illustration, is seated on the drive shaft 20 in the interior of the gear housing.

The gear mechanism also includes an output shaft 22. As shown in FIG. 1, a first end of the output shaft 22 is seated in the interior of the gear housing, and the opposite end of the output shaft 22 extends out of the gear housing. The output shaft is held in the gear mechanism by two bearing bushes 50, 52. The first bearing bush 50 is seated in a centric opening of a floor-shaped wall 10*a* of the pot-shaped first housing part 10. The second bearing bush 52 is held by a gear casing 14, which is fixedly disposed within the gear housing. Through this gear design, rotary motion of the drive shaft 20 is stepped down to the output shaft 22 and the torque is simultaneously increased.

The drive pinion, which is not shown but is seated on the drive shaft 20, meshes with three first gear wheels 32 of the first gear stage. These first gear wheels 32 are spaced apart by equal angles of 120° and are set fixed relative to the center axis 80 of the gear mechanism. The gear wheels 32 have a larger outside diameter than the drive pinion of the drive shaft 20. They are seated rotatably but spatially fixed on their respective bearing axles 16. First ends of the bearing axles 16 as shown in FIG. 1 are supported at openings 12*a* of the second housing part 12, and second ends are supported in the openings 14*a* of the gear casing 14.

Each of the first gear wheels 32 is part of a planetary wheel 30, which is designed as a stepped double gear wheel. Specifically, each of the planetary wheels 30 includes a second gear wheel 34 that is integrally attached to the first gear wheel 32. This second gear wheel has a smaller outside diameter in comparison to its associated first gear wheel 32. Each of the second gear wheels 34 are concentrically and integrally attached respectively to those sides of the first gear wheels 32 of the planetary wheels 30 which face the output shaft 22. The second gear wheels 34 have a cylindrical tooth gearing, which meshes with the inside teeth of a hollow wheel 40. The hollow wheel 40 is pot-shaped and has an annular wall 42, at whose inside surface the inside teeth are formed. The front side of this annular wall 42 of the hollow wheel 40 is integrally joined to a disk-shaped plate. This disk-shaped plate of the hollow wheel 40 has a center opening in which the output shaft 22 is fixedly seated.

Such a gearing creates a two-stage gear mechanism in which the first gear stage is implemented as a cylindrical tooth gearing with three spatially fixed planetary wheels. Due to the connection of three planetary wheels, the rotary motion is symmetrically introduced from the drive pinion of the drive shaft 20. The second gear stage is implemented by the three planetary wheels which mesh with a hollow wheel. A distinctive feature of this gear mechanism is that it reduces the rotating parts, such that the spatially fixed arrangement of the planetary wheels reduces the rotating moments of inertia of the gear mechanism.

The gear housing can be coupled to an electric motor (not shown). For this, the housing part 12 is-implemented as a motor flange for the electric motor. The outer housing of the gear mechanism thus engages the driving gears of the electric motor, whose integrated anti-twist mechanism supports the reaction torques as they occur. Advantageously, this structure allows preassembly of a gear-motor unit as one unit which can be tested separately to provide a motor-gearing module which is ready for mounting in its entirety. The first housing part 12 and thus preferably the motor flange of the electric motor can accept contact tabs 70, which allow the mounted motor-gearing unit to contact a plug or an electronic part. The electric motor is connected to the gear mechanism, for example by welding.

The compact, space-saving gear mechanism shown in FIGS. 1 and 2 is especially suited as an actuator for motor components with gear-engineering and application-specific advantages. These advantages include: reduced rotating moments of inertia; a design that simultaneously ensures strength and space-saving dimensions, due to the distribution of the torque among three engagement wheels; durable bearing points with more stable efficiency and with low friction, due to the use of spatially fixed planetary wheels; and an exact shaft bearing, which allows the introduction of transverse forces at the output shaft, due to the drive shaft being mounted double-sided on the output side and internal to the gear mechanism. The inventive gear mechanism can be used especially in an exhaust gas recycling unit of a motor vehicle.

Although the present invention has been shown and described with respect to several preferred embodiments thereof, various changes, omissions and additions to the form and detail thereof, may be made therein, without departing from the spirit and scope of the invention.

What is claimed is:

1. A two-stage gear mechanism, comprising:
   a drive shaft;
   a first gear stage that includes at least three planetary wheels each having a bearing axle symmetrically arranged about said drive shaft, and each configured and arranged as a stepped double gear wheel having a first gear wheel that engages said drive shaft, and a second gear wheel;
   a second gear stage driven by said first gear stage and meshing with an output shaft, wherein said second gear stage includes a wheel that is non-rotationally coupled to said output shaft;
   a housing having a plurality of housing openings that each accept a first end of one of an associated one of said bearing axles; and
   a gear casing fixedly situated within said housing, wherein said gear casing has a plurality of gear case openings that each accept a second end of one of said associated one of said bearing axles.

2. The gear mechanism of claim 1, wherein said planetary wheels are driven simultaneously by said drive shaft.

3. The gear mechanism of claim 2, wherein said planetary wheels are configured and arranged symmetrically about said drive shaft, and said wheel of said second gear stage is hollow.

4. The gear mechanism of claim 3, wherein said housing includes a first housing part and a second housing part, and a set of ends of the spatially fixed bearing axles are seated in the openings of said casing, and the other set of ends of said spatially fixed bearing axles are seated in openings of said second housing part.

5. The gear mechanism of claim 4, wherein said second housing part includes a motor flange for coupling said gear mechanism to a motor.

6. The gear mechanism of claim 5, wherein said first housing part is pot-shaped and rigidly seated on the second housing part, and said first housing part has a central bore in which is situated a first bearing bush.

7. The gear mechanism of claim 6, wherein said casing supports a second bearing bush centrically to the gear axis.

8. The gear mechanism of claims 7, wherein said first and second bearing bushes support said output shaft axially and radially.

9. The gear mechanism of claim 8, wherein said hollow wheel is pot-shaped and has teeth at its interior circumferential surface, which mesh with said second gear wheels of said planetary wheels, and which are seated non-rotationally on said output shaft.

10. The gear mechanism of claim 9, wherein the motor is non-rotationally connected to said housing of said gear mechanism.

11. A two-stage gear mechanism, comprising:

a drive shaft;

a first gear stage that includes a plurality of planetary wheels symmetrically arranged around and driven simultaneously by said drive shaft, and each configured and arranged as a stepped double gear wheel having a first gear wheel that engages said drive shaft, and a second gear wheel;

a second gear stage driven by said first gear stage and meshing with an output shaft, wherein said second gear stage includes a wheel that is non-rotationally coupled to said output shaft;

a housing; and a casing fixedly situated within said housing, wherein said casing has a plurality of openings to accept spatially fixed bearing axles of said planetary wheels, said housing includes a pot-shaped first housing part and a second housing part includes a motor flange for coupling said gear mechanism to a motor, and a set of ends of the spatially fixed bearing axles are seated in the openings of said casing, and the other set of ends of said spatially fixed bearing axles are seated in openings of said second housing part, wherein said first housing part is rigidly seated on the second housing part, and said first housing part has a central bore in which is situated a first bearing bush.

12. The gear mechanism of claim 11, wherein said wheel of said second gear stage is hollow.

13. The gear mechanism of claim 11, wherein said casing supports a second bearing bush centrically to the gear axis.

14. The gear mechanism of claim 12, said first and second bearing bushes support said output shaft axially and radially.

15. The gear mechanism of claim 12, wherein said hollow wheel is pot-shaped and has teeth at its interior circumferential surface, which mesh with said second gear wheels of said planetary wheels, and which are seated non-rotationally on said drive shaft.

16. The gear mechanism of claim 15, wherein the motor is non-rotationally connected to said housing of said gear mechanism.

17. A gear mechanism, comprising:

a drive shaft;

a first gear stage that includes at least three planetary wheels each having a bearing axle symmetrically arranged about said drive shaft, and each configured and arranged as a stepped double gear wheel that engages said drive shaft;

a second gear stage driven by said first gear stage and meshing with an output shaft, wherein said second gear stage includes a wheel that is coupled to said output shaft;

a housing having a plurality of housing openings that each accept a first end of one of an associated one of said bearing axles; and a gear casing fixedly situated within said housing, wherein said gear casing has a plurality of gear case openings that each accept a second end of one of said associated one of said bearing axles.

18. The gear mechanism of claim 17, wherein said stepped double gear wheel comprises a first gear wheel that engages said drive shaft and a second gear wheel.

* * * * *